United States Patent [19]

Milewski et al.

[11] Patent Number: 4,464,414

[45] Date of Patent: Aug. 7, 1984

[54] METHOD FOR SPRAYING METALLIC COATINGS, ESPECIALLY ON DIFFICULT ACCESSIBLE SURFACES

[75] Inventors: Witold Milewski; Jerzy Brennek; Lech Stanikowski; Wojciech Kunicki; Wieslaw Sapiezynski; Andrzej Konopczynski; Zbigniew Kondratowicz, all of Warsaw, Poland

[73] Assignee: Instytut Mechaniki Precyzyjnej, Warsaw, Poland

[21] Appl. No.: 459,819

[22] Filed: Jan. 21, 1983

[30] Foreign Application Priority Data

Jul. 26, 1982 [PL] Poland ................................. 237654

[51] Int. Cl.$^3$ ............................................. B05D 3/06
[52] U.S. Cl. ..................................... 427/37; 427/422; 427/424; 427/425; 427/427
[58] Field of Search ................. 427/37, 422, 424, 425, 427/427

Primary Examiner—Bernard D. Pianalto

Attorney, Agent, or Firm—Ladas & Parry

[57] ABSTRACT

The invention solves the problem of spraying metallic coatings on difficult-accessible surfaces, especially on internal surfaces of long glass pipes having a small diameter which can be applied as electrodes in ozone generators. The method of spraying metallic coatings according to the invention consisting in melting metal in the electric arc and atomizing it by a stream of compressed gas is characterized by that molten metal is applied on the surface to be coated by means of a closed system of three-stream atomization, which comprises the following streams of compressed gas: a stream directed along wires being melted, a side stream and an opposite blowing-away stream, whereas the head, apart from correspondingly directed nozzles for compressed gas, has also a special connection of wires being melted, constituting electrodes, to a source of current, in a form of flexibly mounted rings inside which said wires are fitted in a manner enabling their continuous shift.

2 Claims, 3 Drawing Figures

METHOD FOR SPRAYING METALLIC COATINGS, ESPECIALLY ON DIFFICULT ACCESSIBLE SURFACES

The subject of the present invention is a method and a head for spraying metallic coatings, especially on difficult-accesible surfaces like internal cylindrical surfaces. The method is particularly suitable for coating with a metallic layer internal surfaces of glass pipes used as electrodes in ozone generators wherein the metallic coating is the internal electrode of the discharge system.

The hitherto known method of metal spraying consists in that in gas flame or electric arc a wire from a corresponding material is melted and molten metal is sprayed on the surface to be coated by means of a stream of compressed gas. This method is described in chapter II of the Handbook of Metal Spraying edited by the Polish Technical Publishers, Warsaw, 1959, pp. 9-19.

Those skilled in the art know a device for hot spraying the inner holes, having a typical metal spraying gun wherein the nozzle being the end of the compressed-air conduit is situated axially in relation thereto. In the axis of the nozzle there is a wire melted in an acetylene-oxygen arc. Such location of the nozzle and overall dimensions of the gun cause that at smaller holes the spraying process is conducted from outside directing the nozzle at the angle of 45° to the surface, and at longer holes whose length, however, is not bigger from two diameters, the spraying process is conducted from both sides of the hole. At the angle smaller than 45° the quality of the produced coating is not too good. For spraying longer holes, however, sufficiently big, for the reason of the overall dimensions of the gun and the necessary angle of its inclination, an extension is applied at whose end the metal spraying gun is placed. By means of this device it is not possible, however, to coat surfaces of small and long holes or difficult-accessible surfaces like grooves, channels, etc. A disadvantage is also overheating of the melting-spraying assembly situated at the end of the extension. This disadvantage causes changes in proportions of gases, in consequence of which the sprayed stream is irregular, unstable and the so-called back-fire of the gun and retreat of the flame occur. The device is also specified in the above mentioned Handbook of Metal Spraying on pages 366, 367 and 368.

Those skilled in the art know also a device wherein for melting the coating material the electric arc is used. The spraying nozzle of the electric-arc gun is situated between two wires to be melted. Devices of this type are manufactured by the company OSU-GFR. They can be used for spraying holes having the diameter not smaller than 150 mm, whereby the obtained coating is irregular and porous having big and irregular-size grains. In devices employing the electric arc for melting wires connection of voltage is realized either through rotary rolls on which the wire slides or through rigid guides of wires. Both these methods show one negative characteristic in common—the lack of fluent operation of the electric arc resulting from a small contact point of the roll or guide with the wire and frequent decay of the electric contact. Metallic coatings obtained with the known methods by means of the known devices are characterized by low adherence to the surface, sensitivity to oxidation, low regularity and big porosity. In the course of the process the sub-surface layer, the so-called glaze, is damaged, and noxious free metallic dust deposits.

The object of the invention is to design a method of applying a metallic coating on surfaces of dielectrics, which will be characterized by good adherence to the dielectric and which will be a well-conducting and durable coating. The object of the invention is also to design a method of application in which the superficial structure, the so-called glaze of the dielectric, will not be injured, the crystalline system of the superficial layer of the dielectric will not be damaged, and free metallic dust will not deposit.

The object of the invention is also to design a device for electric-arc spraying metallic coatings on difficult-accessible surfaces, especially on internal cylindrical surfaces having the inner diameters of 40 mm and bigger, by means of which the obtained coating is homogeneous, fine-grained and well-adhesive to the coated surface.

The method of spraying metallic coatings according to the invention consisting in melting metal in an electric arc and atomizing it in a stream of compressed gas is characterized by that molten metal is applied onto the surface to be coated by means of a closed system of three-stream atomization, which comprises the following streams of compressed gas: the stream directed along wires being melted, the side stream and the blowing-away stream. The side stream is directed at an angle to the surface being coated and cocurrently to its translatory motion, whereas the blowing-away stream is also directed at an angle to the surface being coated and at the same time counter-currently to its translatory motion. The amount of gas constituting the blowing-away stream is from 10 to 30% of the other amount of gas used. The resultant stream of atomized metal is directed at an angle of from 45° to 60° to the surface being coated.

The head for spraying metallic coatings realizing the method according to the invention is characterized by that it has a three-stream system of nozzles for compressed gas. The said system comprises nozzles of the central stream directed along wires being melted, a nozzle of the side stream directed at an angle to the surface being coated and cocurrently to its translatory motion, and a nozzle of the blowing-away stream also directed at an angle to the surface being coated and counter-currently to its translatory motion. Connection of wires between which the electric arc appears to a current source is realized by means of so-called floating terminals which are constituted by a series of rings situated side by side, preferably made of copper, mounted flexibly. Inside them wires shift, which are fitted in a manner enabling their continuous shift. Then wires are guided in guides situated, which is also significant, inside the nozzle of the central stream. Wires are inclined among themselves at an angle from 15° to 35°. It is preferable for the stability of the arc and the quality of the obtained coating that the inclination angle of the nozzle of the side stream is 60° to the surface being coated, whereas that of the nozzle of the blowing-away stream is 45°.

The application of the three-stream system of atomizing molten metal has eliminated disadvantages of the hitherto known methods, namely, by means of the blowing-away stream free metallic dust appearing in the course of the process is removed, due to which a good quality of the sprayed-on coating is obtained. Due to the fact that the main heat flux is not too big and is, besides, directed at a definite angle to the surface being coated, it is heated only to a small degree, maximum up to 65°, and due to this the number of defects which are made during the process is close to zero. Supply of electric energy to wires provides for constant and uniform operation of the device with simultaneous maintenance of the optimum spraying parameters and a very high durability of particular parts of the melting-spraying assembly, as well as good stability of the arc, which is also promoted by location of wire guides in the nozzles and the mutual inclination of wires within the limits from 15° to 35°.

In result of designing this type of the head and technology according to the invention a possibility has been obtained of producing metallic coatings on internal surfaces of glass pipes having the diameter of from 40 mm and the wall thickness of 2 mm, which are used as electrodes in ozonators. The arc-sprayed coating by the method according to the invention is characterized by high fine-graininess, a low degree of oxidation, lower than in flame metallization and good adhesion to the dielectric, as well as high stability. The method according to the invention eliminates inconvenient preliminary heating of glass pipes before metallization, as it is necessary in the method of flame metallizing glass pipes, and does not require the application of expensive technological gases, such as oxygen and acetylene. Elimination of faults makes the technology according to the invention less expensive from the hitherto known ones. The method also brings about an improvement of the industrial safety conditions because it eliminates from the process flame devices, eliminating completely the fire hazard.

Easy automatization of the process conducted by the method according to the invention ensures repeatability of production and obtaining the optimum parameters of coatings.

The method according to the invention is presented in an exemplary embodiment.

EXAMPLE 55 glass pipes having the length of 1200 mm and diameter of 50 mm were to be metallized. The pipes were designed for electrodes in ozonators. Each pipe was metallized in the same conditions. The metal spraying head was introduced into the pipe on an outrigger. The pipe rotated with the speed of 200 revolutions per minute and was at the same time shifted with the speed of 40 mm/sec. The electric arc melting metal was produced between two aluminium wires. During metal spraying the temperature of the pipe wall rised only by 30° C. Molten metal was sprayed by compressed air at an angle of 45° to the generating line of the pipe. The said angle was the resultant angle from the compressed air blow along the pipe, cocurrently to the direction of displacement of the pipe being metal sprayed, and from a second blow in the opposite direction. For blowing aluminium melted in the electric arc compressed air was used at an amount of 60.0 normal liters per minute. Along the pipe 12 normal liters per minute were blown.

BRIEF DESCRIPTION OF THE DRAWING

The metal spraying head according to the invention is shown in an exemplary embodiment in the drawing, wherein.

DETAILED DESCRIPTION OF THE DRAWING

Figure 2:
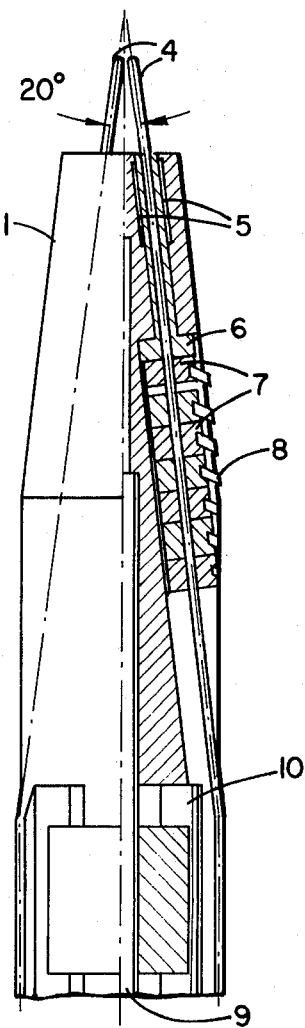

The body 1 of the head is in a form of a cylindrical shaft contracting to the front. Beside the body 1 there is an air conduit 2 whose end is provided with a nozzle 3 of the side stream. In the body 1 wires 4 are situated which at the same time constitute electrodes. Said wires 4 converge at the angle of 20° and are situated centrically inside nozzles 5 (FIG. 2) of the central air stream. Also guides 6 of wires 4 are situated centrically and inside nozzles 5, whereby said wires 4 shift through flexibly mounted copper rings 7 being the so-called floating slides. To rings 7 voltage is supplied by means of electric conductors 8 and a central conductor 10.

Air to the nozzle 3 and the nozzle 5 is supplied through a central conduit 9.

Figure 3:
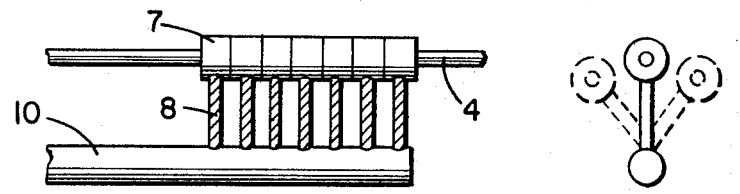
Figure 1:
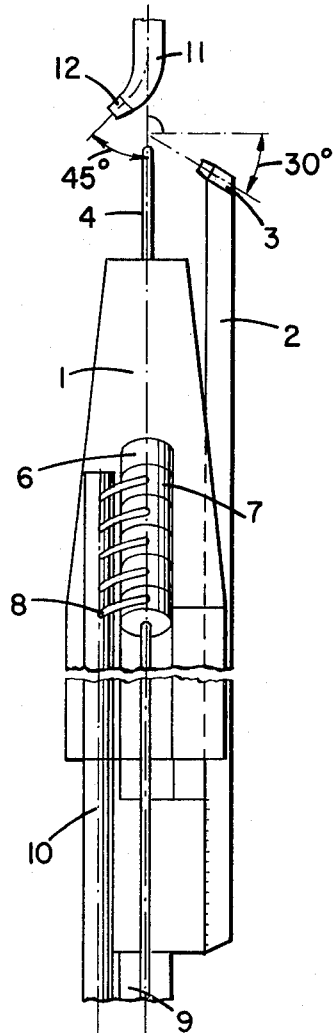
FIG. 1 shows the side view of the head, FIG. 2—the axial cross-section, and FIG. 3—the method of supplying voltage to the wires (electrodes).

Opposite the front face of the metal spraying head there is an air conduit 11 terminated with a nozzle 12 of the blowing-away stream. Electric conductors 8 perform at the same time the function of flexible fixings of rings 7 causing constant electric contact with the wire, as shown in FIG. 3.

What is claimed is:

1. A method of spraying metallic coatings, especially on difficult-accessible surfaces, consisting in melting metal in an electric arc produced between wires constituting meltable electrodes mounted in a metal spraying head and in atomizing molten metal by a stream of compressed gas and transferring it onto the surface being coated, performing in relation to the metal spraying head relative translatory motion or translatory and rotary motion, characterized in that molten metal is applied on the surface by means of a closed system of three-stream atomization which comprises a central stream of compressed gas directed along wires being melted, a side stream of compressed gas directed at an angle to the surface being coated and cocurrently to its translatory motion, and a blowing-away stream of compressed gas directed at an angle to the surface being coated and counter-currently to the translatory motion thereof, and the amount of gas forming the said blowing-away stream is 10–30% of the other amount of gas.

2. A method according to claim 1, characterized in that the resultant stream of atomized metal is directed an an angle of from 45° to 60° to the surface being coated.

* * * * *